United States Patent [19]

Bull

[11] 4,329,159

[45] May 11, 1982

[54] ENERGY SAVING HEAVY CRUDE OIL EMULSION TREATING METHOD AND APPARATUS FOR USE THEREWITH

[76] Inventor: Hendrix R. Bull, 16861 Saybrook La., Huntington Beach, Calif. 92647

[21] Appl. No.: 87,559

[22] Filed: Oct. 22, 1979

[51] Int. Cl.³ .............................................. B01D 19/00
[52] U.S. Cl. ......................................... 55/42; 55/45; 55/174; 55/175; 55/208
[58] Field of Search ..................... 55/174, 175, 42, 45, 55/208; 210/71, 730 W, 83, 242 AS

[56] References Cited

U.S. PATENT DOCUMENTS

| | | | |
|---|---|---|---|
| 3,389,536 | 6/1968 | Bull | 55/175 |
| 3,418,252 | 12/1968 | Francis, Jr. | 55/174 |
| 3,641,741 | 2/1972 | Smith | 55/175 |
| 4,012,207 | 3/1977 | Jones | 55/175 |

*Primary Examiner*—Robert H. Spitzer
*Attorney, Agent, or Firm*—I. Michael Bak-Boychuk

[57] ABSTRACT

An apparatus and method of using the same to separate a heavy crude oil emulsion into gas, brine and oil, as the emulsion flows longitudinally through first, second, and third elongate zones. The crude oil emulsion is heated while in the first and second zone allowing the free brine and gas to separate therefrom. The heated crude oil containing the remaining emulsified brine flows to the third zone to be subjected to a high potential electrical field which coalesces the droplets of brine remaining therein into drops. These larger drops of brine flow downwardly by gravity to the bottom of the third zone. Oil substantially free of brine now in the top layers flows from the third zone over a wall into a reservoir, with the wall serving the dual function of maintaining the liquid level in the third zone at an elevation where the electrodes that supply the high potential electrical field are at all times immersed in the oil, and also preventing brine-free oil in the reservoir from comingling with oil that is being treated in the third zone. Gas separating from the emulsion accumulates in the upper portion of the first, second and third zones and water in the lower portion of the zones. The gas and brine that so accumulate are withdrawn therefrom to desired external location as the treating operation proceeds. Oil may be intermittently or continuously discharged from the reservoir without effecting the liquid level in the third zone.

5 Claims, 9 Drawing Figures

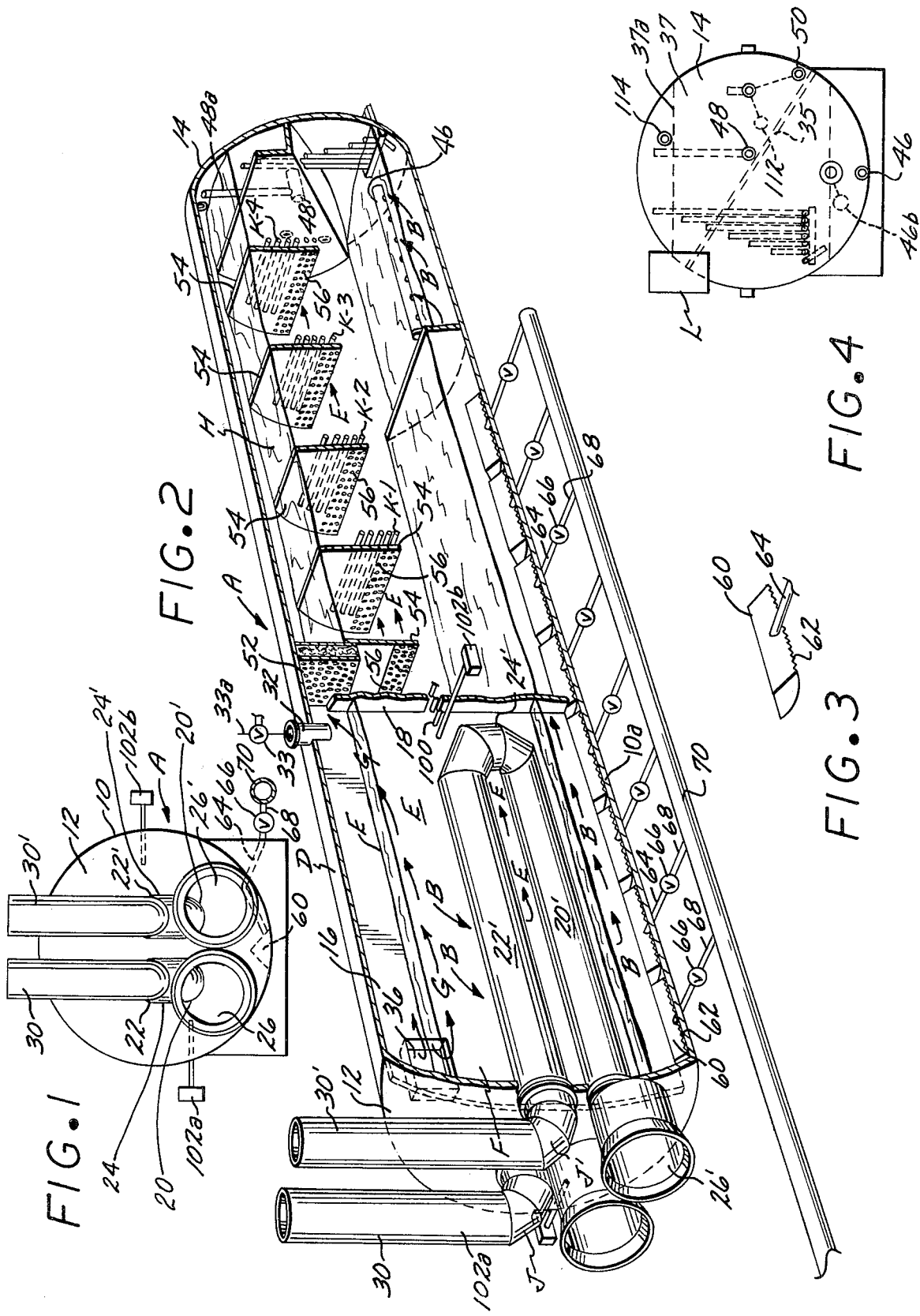

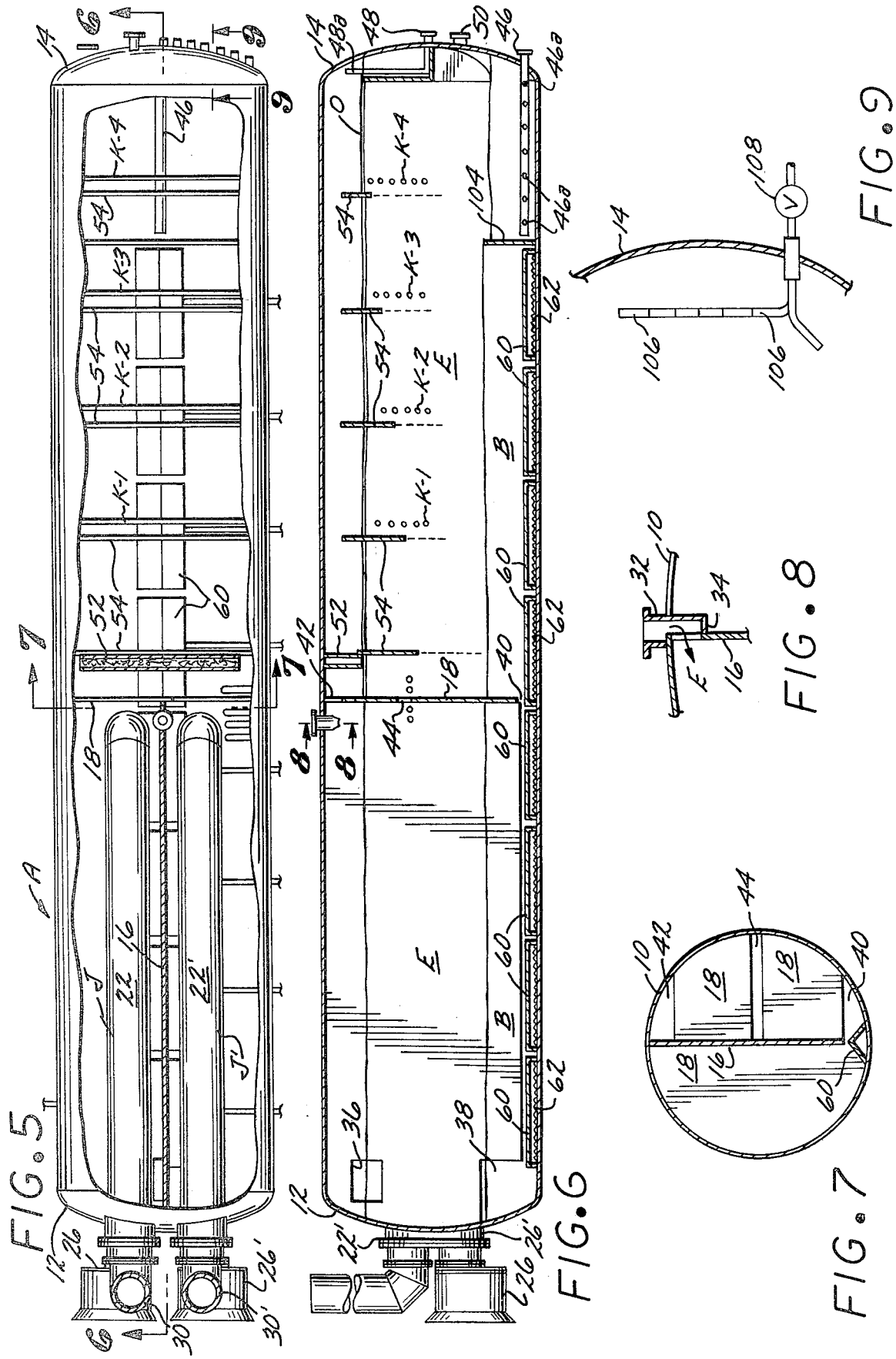

ENERGY SAVING HEAVY CRUDE OIL EMULSION TREATING METHOD AND APPARATUS FOR USE THEREWITH

BACKGROUND OF THE INVENTION

1. Field of the Invention

Energy Conserving Emulsion Treating Apparatus and Method of Using the Same.

2. Description of the Prior Art.

The initial product that is ultimately transformed by a refinery into desired hydrocarbon products is frequently a heavy viscous emulsion of brine, oil and gas, with the brine and gas existing in the emulsion in both a free and emulsified state. Failure to remove all brine from oil prior to the latter being subjected to refining is highly undesirable, as the stills or pressure vessels in which the oil is heated will become caked with salt that has corrosive action on steel and is also a poor heat conductor.

In the past it has been common practice to heat such emulsions to high temperatures to lower the viscosity of the emulsion. The heating lowers the viscosity to the extent that free gas and brine separate from the emulsion. Further heating of the emulsion to a still higher temperature tends to coalesce the remaining emulsified brine into drops of sufficient weight as to move downwardly through the oil by gravity to a brine collecting area.

The final coalescing of the emulsified brine as above described has the operational disadvantage that at the best is a time consuming operation, requires that the oil be held stationary in a large quantity as the coalescing takes place, and also that the oil be heated to a sufficiently high temperature to reduce the viscosity thereof so that coalescing of the emulsified droplets will take place. The maintenance of a large quantity of oil at a relatively high temperature at which such coalescing of brine droplets will take place results in a substantial expenditure of heat energy which is highly undesirable at the present time when there is a shortage of both gas and oil for heating purposes.

A major object of the present invention is to provide a method of treating a heavy viscous emulsion to obtain a substantially complete separation of brine and gas from the oil in a shorter length of time than with previously available methods, and with a substantially lesser consumption of energy.

Another object of the invention is to effect the coalescing of droplets of brine in the oil by subjecting the droplets to a high tension electrical field.

Yet another object of the invention is to provide an apparatus for carrying out the method that includes a reservoir partially defined by a vertical wall serving to automatically maintain the liquid level of the oil being treated by a high potential electrical field at such elevation that the high tension electrodes are at all times immersed in the oil, and the wall preventing comingling of substantially brine-free oil in the reservoir with oil containing emulsified brine that is being subjected to electrical treatment.

SUMMARY OF THE INVENTION

An energy conserving method of treating a heavy viscous emulsion of oil, brine and gas to separate the emulsion into the three components thereof, and an apparatus for carrying out the method.

An elongate horizontal tank is provided that by first and second partitions has the interior thereof subdivided into first, second and third compartments or zones in which the emulsion is successively treated. The first and second compartments have first and second heaters therein that may be fired by either gas or oil.

The emulsion is continuously discharged into the upper portion of the first compartment to be heated. The partition separating the first and second compartments has an upper and lower opening therein. The emulsion as it flows into the first compartment has free gas separate therefrom, with the emulsion increasing in density as a result thereof, and flowing downwardly and longitudinally in the first compartment. The emulsion as it is heated in the first compartment to a first temperature as the viscosity thereof reduced with free water settling out therefrom.

The emulsion from which free brine and gas has separated flows through an opening in one of the partitions into the second compartment where it is further heated. As the temperature increases, emulsified gas tends to escape due to a lowering of the viscosity of the emulsion, and emulsified oil separating from the emulsion when a third temperature is reached. Each of the first and second compartments has a separate control means for regulating the temperatures in each of the compartments. Oil still containing emulsified brine flows from the second compartment to the third compartment. The oil in flowing longitudinally through the third compartment is diffused transversely by passing through apertured plates. A number of metallic apertured electrodes are suspended adjacent the apertured plates, and electrically insulated from the tank. The electrodes are supplied by high tension electrical energy by being connected to one terminal of a suitable transformer having the other terminal grounded to the tank.

The terminals provide a series of longitudinally spaced fields of high electrical potential that causes droplets of emulsified oil to move violently in random directions, with the droplets collecting and coalescing as a result thereof into drops of sufficient weight as to move downwardly by gravity to the lower portion of the third compartment. Brine that has separated from the emulsion in the first, second and third compartments is permitted to flow from the tank, as is gas, to desired exterior locations.

A reservoir is provided within the tank adjacent the third compartment, which reservoir is partially defined by a vertical wall that has a horizontal upper edge. The wall serves a dual function, with the upper edge automatically determining the liquid level in the third compartment, and the wall also serving to prevent comingling of substantially brine-free oil in the reservoir from oil being electrically treated in the third compartment. The wall maintains the liquid level in the third compartment at such an elevation that the electrodes are at all times completely immersed in the oil. Oil may be intermittently withdrawn from the reservoir without effecting the liquid level in the third compartment. Means are provided on the tank to sample the oil being treated in the third compartment at various elevations therein.

BRIEF DESCRIPTION OF THE DRAWINGS

FIG. 1 is a first end view of the emulsion treating apparatus;

FIG. 2 is a perspective view of the apparatus that has a longitudinal portion thereof cut away to illustrate the interior of the apparatus;

FIG. 3 is a perspective view of a sand removing assembly used in the apparatus;

FIG. 4 is a second end view of the apparatus to illustrate the location of certain outlets;

FIG. 5 is a top plan view of the apparatus;

FIG. 6 is a longitudinal cross-sectional view of the apparatus;

FIG. 7 is a transverse cross-sectional view of the apparatus taken on the line 7—7 of FIG. 5;

FIG. 8 is a fragmentary transverse cross-sectional view of the apparatus taken on the line 8—8 of FIG. 6; and FIG. 9 is a fragmentary cross-sectional view of the apparatus taken on the line 9—9 of FIG. 5.

DESCRIPTION OF THE PREFERRED EMBODIMENT

As apparatus A by which the method of the present invention may be carried out to effect a separation of a viscous emulsion E into the respective components thereof, namely, brine B, gas G, and substantially brine-free oil O, is shown in FIG. 2.

The apparatus A includes an elongate cylindrical metallic tank 10, that has a first end 12 and second end 14. A first partition 16 extends longitudinally from the first end 12 within tank 10 to abut against a second partition 18, likewise situated within the tank. The first partition 16 and second partition 18 cooperate with a portion of the interior of tank 10 to define two longitudinally extending parallel compartments D and F that are situated side-by-side. Second partition 18 cooperates with the balance of the interior of tank 10 to provide a third elongate compartment H. The first, second and third compartments serve to provide first, second and third zones in which sequential treatment of the emulsion E takes place as will later be explained in detail.

The first and second compartments D and F have substantially identical first and second heaters J and J' disposed therein. Each heater J includes a lower elongate tubular leg 20, upper tubular leg 22, and a tubular end connector 24. The lower leg 20 extends through first end 12. A burner assembly 26 is connected to lower leg 20 exteriorly of tank 10. The upper leg 22 has a stack 30 extending upwardly therefrom outside tank 10. Elements of the second heater J' common to the first heater are identified by the same numerals used with the first form, but with primes being added thereto.

Emulsion E may be discharged continuously into the first compartment D through the inlet 32 which preferably has a normally open automatically operated valve 33 associated therewith, which valve by a conduit 33a is connected to a source of emulsion (not shown). The inlet 32 has a half portion thereof blocked by a plug 34 (FIG. 8) so that emulsion E discharges only into first compartment D.

The first partition 16 has an upper opening 36 therein, preferably in the form of a transverse box, that is located adjacent the first end 12. First partition 16 also has a lower opening 38 (FIG. 6) therein, also adjacent first end 12. The upper and lower openings 36 and 38 are best seen in FIG. 6.

The second partition 18 which is transversely disposed in tank 10 is best seen in FIG. 7. In FIG. 7 it will be seen that the portion of second partition to the left of first partition 16 is solid and of semi-circular shape. The semi-circular portion of second partition 18 to the right of first partition 16 has a lower opening 40, upper opening 42, and intermediate opening 44 defined therein.

An angularly disposed baffle 35 extends inwardly into tank 10 from the second end 14 thereof and is connected on the inner end to a vertical transverse wall 37 that has an upper horizontal edge 37a. The elevation of the edge 37a determines the height of emulsion in first and second compartments D and F, and the overall height of the strata of oil and brine in third compartment H as will later be explained in detail. Baffle 35, wall 37 and the interior surface of tank 10 adjacent second end 14 cooperate to define a reservoir R into which substantially brine free oil O is discharged, and that results from the treatment of emulsion in the first, second and third compartments D, F and H.

The second end 14 has a gas outlet 48, brine-free oil outlet 50, and brine outlet 46 therein as shown in FIG. 4. A foam removing assembly 52 is disposed in third compartment H adjacent upper opening 42 as shown in FIGS. 2 and 6. A number of transverse, longitudinally spaced diffusion plates 54 are located in the upper portion of third compartment H as shown in FIG. 2, and are supported from the interior of tank 10 by conventional means (not shown). The plates 54 have a number of spaced transverse openings 56 therein.

A number of transversely aligned electrodes K-1 to K-4 are disposed in vertical planes in the upper portion of the third compartment H and are supported from the metallic tank 10 by conventional electrical insulating means (not shown). A high tension electrical current supplying transformer L is located adjacent tank 10. The transformer L shown in FIG. 4 supplies high tension voltage to the electrodes K-1 to K-4.

A number of inverted, longitudinally spaced boxes 60 extend longitudinally along the interior bottom portion 10a of tank 10 as shown in FIGS. 2 and 6. The boxes 60 have openings 62 in the sides thereof through which sand and silt (not shown) may flow to the interior thereof. The interior of each box 60 is connected to a first conduit 64 that extends outwardly through tank 10 to a valve 66 as shown in FIG. 2. Second conduits 68 are connected to valves 66 and extend to a header 70 that may be subjected to negative pressure by a pump or the like (not shown).

When the apparatus A is operating at maximum efficiency the liquid level in the first, second and third compartments D, F and H will be at the elevation of the edge 37a of wall 37.

The first and second heaters J and J' will be supplying heat to the first and second compartments D and F. The emulsion E as it is treated is in motion and sequentially flows through the first, second and third compartments D, F and H in a horizontal path. The heat supplied by first heater J to emulsion E flowing into the first compartment D through inlet 32 adjacent second partition 18 is only that necessary to lower the viscosity of the emulsion to the extent free gas G and free brine B separate therefrom. As free gas escapes from emulsion E the density thereof increases and it flows downwardly and longitudinally in first compartment towards first end 12 and has the temperature thereof further increased due to first heater J to complete the separation of free gas and brine from the emulsion, the temperature being regulated by a control means 102a.

The free gas flows through upper opening 36 into the upper portion of second compartment F. Free water that separates from emulsion E in first compartment D flows transversely through lower opening 38 into second compartment F together with heated emulsion E.

The emulsion E flowing into the second compartment F is further heated by the second heater J' only to the extent that the viscosity of the emulsion is lowered so that all of the emulsified gas will separate therefrom and rise to the upper portion of the second compartment. The temperature in the second compartment lowers the viscosity of the emulsion E to the extent that not only does all of the emulsified gas separate but a portion of the emulsified brine as well, the temperature being regulated by a control means 102b. This portion of the emulsified brine coalesces into drops that by gravity flow downwardly to the bottom portion of second compartment F, and merge with brine that has flowed to the lower portion of the second compartment from first compartment D.

The emulsion E that is substantially free of gas but still contains a substantial quantity of emulsified brine flows through intermediate opening 44 in second partition 18 into the third compartment H. Gas G flows from second compartment F into the upper portion of third compartment H through the upper opening 42 in second partition 18. Brine B that has collected in the lower portion of second compartment F flows through lower opening 40 in second partition 18 into the lower portion of third compartment H.

The substantially gas free emulsion flowing into the third compartment through intermediate opening 44 shown in FIG. 7 is transversely diffused by flowing through openings 56 in diffuser plates 54. This diffused emulsion as it flows longitudinally and substantially horizontally towards the second end 14 of tank 10 is subjected to a series of high potential electrical fields that surround the electrodes K-1 to K-4. Droplets of emulsified brine when in these fields due to becoming charged move violently in random directions to contact one another and coalesce into drops of brine that are of sufficient weight as to move downwardly through the emulsion to the bottom portion of the third compartment and merge with brine that has flowed into the third compartment from the second compartment F.

As the emulsion is treated in third compartment H it is transformed into gas and brine free oil O. The gas and brine-free oil O having a lesser density than the emulsion containing brine rises to the top in the third compartment H. As emulsion E continues to be discharged into first compartment D the liquid level rises in third compartment H. This rise in the liquid level causes the oil O free of gas and brine to flow over the edge 37a of wall 37 into reservoir R. Oil O free of gas and brine may be either intermittently or continuously withdrawn from reservoir R without disturbing the liquid level of emulsion E being treated in the first, second and third compartments D, F and H.

The wall 37 serves a three-fold purpose: first, automatically maintaining the liquid level of emulsion in the first, second and third compartments D, F and H at a desired elevation; second, preventing comingling of brine and gas free oil in reservoir R with emulsion being treated in the third compartment; and third, allowing gas and brine free oil to be withdrawn from the reservoir without effecting the liquid level of emulsion in the compartments.

It will be apparent that in practice the method previously described is desirably carried out automatically and this may be achieved by the use of conventional process control equipment that is electrically and/or pneumatically operated and is well known in the industry.

A number of temperature sensors 100 are shown in FIG. 2 that are operatively associated with conventionally operated assemblies 102a and 102b that control the operation of the first and second heaters J and J'. The heaters J and J' are so controlled by assemblies 102a and 102b to heat emulsion E in the first and second compartments only to the extent that free gas and brine separate from the emulsion in the first compartment D which may be regarded as a first heated zone and emulsified gas and some emulsified brine separates from the emulsion in the second compartment F which is a second heated zone.

The gas outlet 48 extends into the reservoir R and then upwardly into a vertical extension 48a that terminates adjacent the upper portion of tank 10 as shown in FIGS. 2 and 4.

The brine outlet pipe 46 extends into the lower interior of tank 10 as shown in FIG. 6 and has perforations therein through which brine B may flow. A transverse wall 104 of relatively small height is secured to the lower interior portion of tank 10 intermediate the box 60 most adjacent second end 14 and the inner extremity of outlet pipe 46 which is closed. Brine B will accumulate as a pool to the left of wall 104 as viewed in FIG. 6 until it has reached a depth greater than the height of wall 104 whereupon it will flow over the latter into the space to the right thereof to flow through perforations 46a. Flow of gas G and brine B from outlets 48 and 46 is controlled by conventional valves (not shown).

A number of L-shaped tubes 106 extend through second end 14, with each tube including an exteriorly disposed, normally closed, valve 108. The tubes 106 have vertical portions within tank 10 of various heights. By opening an appropriate valve 108, a sample of liquid within third compartment H at a particular height therein may be obtained. Flow of brine through outlet pipe 46 may be automatically controlled by a conventional float actuated valve assembly 46b. A second conventional float actuated valve assembly 112 shown in FIG. 4 may be utilized to automatically control the flow of brine free oil from outlet 50. A high level float operated assembly 114 is shown in FIG. 4. that actuates valve 33 to close if the liquid level in tank 10 becomes dangerously high.

The method capable of being performed by the apparatus A may be summarized as follows: As emultion E discharges into the first compartment D free gas and brine start to separate therefrom with this separation continuing as the emulsion flows downwardly and longitudinally towards first end 12. The downward portion of the flow is due to the density of the emulsion E increasing as free gas separates therefrom.

The free gas that separates from emulsion E in first compartment D flows through opening 36 into second compartment F. Brine that separates from emulsion E flows downwardly by gravity to the lower portion thereof and flows through lower opening 38 into second compartment F together with heated emulsion E.

The second heater J' further heats the emulsion E entering second compartment F to the extent that the viscosity thereof is lowered to a degree that emulsified gas separates therefrom together with a portion of the emulsified brine. The gas separating from the emulsion in second compartment F together with gas that entered the second compartment from the first compartment D flow through the upper opening 42 shown in FIG. 7 into third compartment H. Brine B that separates from emulsion E in second compartment F together with brine that entered the second compartment from first compartment D flow through the lower opening 40 into third compartment H. The emulsion E that is free of gas and partially free of emulsified oil flows through intermediate opening 44 into third compartment H. From FIG. 6 it will be seen that the flow of gas G, brine B and emulsion E through compartments D, F and H is substantially horizontal. The substantially horizontal flow has the benefit of being less resistant to the rise of gas vapors and the fall of brine droplets.

The emulsion E as it flows longitudinally through third compartment H is subjected to the high tension fields set up around electrodes K-1 to K-4 inclusive with the droplets of emulsified oil coalescing into drops of sufficient weight as to flow downwardly through the emulsion in the third compartment to merge with brine that has flowed thereto from the second compartment F. As emulsified brine is removed from the emulsion E, the oil that results therefrom is of lesser density than the emulsion and rises to the top thereof and accumulates as an upper strata O. The upper strata of oil O is free of gas and brine. As emulsion E is discharged into first compartment D, the liquid level in third compartment H rises and the strata O of oil flows over the horizontal edge 37a of wall 37 into reservoir R.

The wall 37 serves three functions, namely, to limit the height of the liquid in apparatus A, to separate gas and brine and gas-free oil O from the emulsion being treated, and to prevent the brine and gas free oil O in reservoir R from comingling with emulsion E being treated. By opening the valve 66 shown in FIG. 2 when a negative pressure is maintained in header 70 sand that has accumulated in boxes 60 may be withdrawn from apparatus A together with some brine B that has accumulated in the lower portions of tank T. The removal of oil O, brine B, and gas from apparatus A has been described previously in detail and need not be repeated.

What is claimed is:

1. An apparatus for use in separating a viscous emulsion of oil, gas and brine into the components thereof with a minimum of heat energy, said apparatus being of the type that includes an elongate horizontal tank having first and second ends; a plurality of partitions in said tank that subdivide the interior thereof into first, second and third elongate interconnected compartments through which said emulsion sequentially flows; first and second heaters in said first and second compartments that heat said emulsion when therein only to the extent that the viscosity of said emulsion when in said first and second compartments is reduced to the degree that free gas and brine separate from said emulsion when in said first compartment and emulsified gas and a portion of the emulsified brine when in said second compartment, said apparatus being characterized by:
   a. a heat controlled means in each of the first and second compartments to regulate the temperature in each compartment to the temperature required to effect the removal of free water and free gas in the first compartment and the removal of emulsified gas and a portion of the emulsified water in the second compartment;
   b. a plurality of longitudinally spaced transversely disposed electrodes aligned along a vertical plane within the upper portion of said third compartment that are electrically insulated from said tank;
   c. a conductive diffusion plate mounted transversely adjacent said electrodes;
   d. first means for supplying high tension electrical energy across said electrodes and said diffusion plate to create a plurality of high electrical potential fields thereabout in which emulsified brine remaining in said emulsion is coalesced into drops thereof that flow to the bottom of said third compartment; and
   e. second and third means for removing gas and brine from said third compartment.

2. An apparatus as defined in claim 1 in which said third compartment contains a reservoir adjacent said second end, said reservoir including an upwardly extending wall that terminates in an upper horizontal edge, said horizontal edge of sufficient elevation that the liquid level in said third compartment is maintained at a height that said electrodes are at all times immersed therein, and said wall serving the further functions of allowing gas and brine free oil that has risen to the top of said emulsion being treated to flow over said horizontal edge into said reservoir from comingling with emulsion in said third compartment that is being treated, and permitting gas and brine free oil to be withdrawn from said reservoir without disturbing the liquid level of emulsion in said first, second and third compartments.

3. An apparatus as defined in claim 1 in which said diffusion plates and said electrodes are disposed transversely in the upper portion of said third compartment in longitudinally spaced relationship, with each of said electrodes having a plurality of spaced openings therein through which said emulsion may flow as said emulsion is being treated.

4. An apparatus as defined in claim 1 in which said second means is a conduit in communication with the upper portion of said third compartment and said third means is a conduit in communication with the lower portion of said third compartment.

5. A method of continuously treating a flow of a viscous emulsion of oil, gas and brine to separate said emulsion into the components thereof with a minimum of energy that includes the steps of:
   a. directing said continuous flow of emulsion sequentially through first, second and third zones;
   b. heating said emulsion when in said first zone only to the extent that the viscosity thereof is lowered to a degree that free gas and brine separate therefrom;
   c. further heating said emulsion when in said second zone only to the extent that the viscosity thereof is further lowered to a degree that a portion of emulsified brine separates therefrom and substantially all emulsified gas therefrom;
   d. subjecting said emulsion in said third zone to at least one high potential substantially horizontal electrical field to coalesce emulsified brine remaining therein into drops that flow by gravity to the bottom, with brine and gas free oil due to the lesser gravity rising to the top of the emulsion in said third zone to float as a strata thereon;
   e. continuously removing said gas and brine free oil strata as it accumulates in said third zone;
   f. continuously removing said gas as it accumulates in said first and second zones and discharging it to the exterior thereof;
   g. collecting said brine that separates from said emulsion in said first, second and third zones; and
   h. comingling and discharging said brine to a desired location.

* * * * *